United States Patent [19]

Karabed et al.

[11] Patent Number: 4,888,779
[45] Date of Patent: Dec. 19, 1989

[54] MATCHED SPECTRAL NULL TRELLIS CODES FOR PARTIAL RESPONSE CHANNELS

[75] Inventors: Razmik Karabed; Paul H. Siegel, both of San Jose, Calif.

[73] Assignee: International Business Machines Corporation, Armonk, N.Y.

[21] Appl. No.: 169,920

[22] Filed: Mar. 18, 1988

[51] Int. Cl.$^4$ ............................................. G06F 11/00
[52] U.S. Cl. ..................................................... 371/43
[58] Field of Search ........................ 371/43, 44, 45, 55; 341/59, 81, 95; 375/18, 39

[56] References Cited

U.S. PATENT DOCUMENTS

| | | | |
|---|---|---|---|
| 4,609,907 | 9/1986 | Adler | 341/106 X |
| 4,707,681 | 11/1987 | Eggenberger | 341/59 |
| 4,786,890 | 11/1988 | Marcus | 341/59 |

OTHER PUBLICATIONS

J. K. Wolf and G. Ungerboeck, "Trellis Coding for Partial-Response Channels", IEEE Trans. Comm., vol. COM-34, No. 8, Aug. 1986, pp. 765–773.

T. A. Lee and C. Heegard, "An Inversion Technique for the Design of Binary Convolutional Codes for the 1-D$^N$ Channel", Proc. IEEE Regional Mtg., Johns Hopkins, Feb. 1985.

A. R. Calderbank, C. Heegard and T. A. Lee, "Binary Convolutional Codes with Application to Magnetic Recording", IEEE Trans. Info. Th., vol. IT-32, No. 6, Nov. 1986, pp. 797–815.

H. Thapar and A. Patel, "A Class of Partial Response Systems for Increasing Storage Density in Magnetic Recording", presented at Intermag 1987, Tokyo, Japan.

R. Wood, "Viterbi Reception of Miller-Squared Code on a Tape Channel", Proceedings of IERE Video and Data Recording Conference, Southhampton, England, 1982.

K. Immink and G. Beenker, "Binary Transmission Codes with Higher Order Spectral Zeroes at Zero Frequency", IEEE Trans. Info. Th., vol. 33, No. 3, May 1987, pp. 452–454.

*Primary Examiner*—Jerry Smith
*Assistant Examiner*—Robert W. Beausoliel
*Attorney, Agent, or Firm*—Henry E. Otto, Jr.

[57] ABSTRACT

A method is disclosed for coding input strings for a partial response channel to provide an output having a reliability determined by a preselectable coding gain. This method involves determining each frequency at which there is a zero in the transfer function of the partial response channel, and then encoding an input string into a binary code string having a power spectrum value of zero for each such frequency. A channel output sequence is generated responsively to transmission of the code string through the channel. The most probable sequence among those having a power spectrum value of zero is then calculated from the channel output sequence and decoded to provide the output.

13 Claims, 7 Drawing Sheets

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0-202 | | 0-201 | | | 0-2-11 | | | | 0-2-10 | | | | | |
| 2 | -1-202 | | -1-201 | | | -1-2-11 | | | | -1-2-10 | | | | | |
| 3 | | -1021 | | -1020 | -1-112 | | -1010 | | | | -101-1 | | | -1-101 | |
| 4 | | -2021 | | -2020 | -2-112 | | -2010 | | | | -201-1 | | | -2-101 | |
| 5 | | 0-111 | | 0-110 | 0-202 | | 0-100 | | | | 0-10-1 | | | 0-2-11 | |
| 6 | 20-11 | | 20-10 | | | 20-20 | | 1-102 | | | | 1-101 | | | |
| 7 | 10-11 | | 10-10 | | | 10-20 | | 0-102 | | | | 0-101 | | | |
| 8 | 1-1-11 | | 1-1-10 | | | 1-1-20 | | 0-202 | | | | 0-201 | | | |
| 9 | 0-1-11 | | 0-1-10 | | | 0-1-20 | | -1-202 | | | | -1-201 | | | |
| 10 | | 1210 | | 121-1 | 1101 | | 120-1 | | 0121 | | 120-2 | | 0120 | 11-10 | 0012 |
| 11 | | 0210 | | 021-1 | 0101 | | 020-1 | | -1121 | | 020-2 | | -1120 | 01-10 | -1012 |
| 12 | | 0110 | | 011-1 | 0001 | | 010-1 | | -1021 | | 010-2 | | -1020 | 00-10 | -1-112 |
| 13 | | -1110 | | -111-1 | -1001 | | -110-1 | | -2021 | | -110-2 | | -2020 | -10-10 | -2-112 |
| 14 | | 2100 | | 210-1 | 20-11 | | 21-1-1 | | 1011 | | 21-1-2 | | 1010 | 20-20 | 1-102 |
| 15 | | 1000 | | 100-1 | 1-1-11 | | 10-1-1 | | 0-111 | | 10-1-2 | | 0-110 | 1-1-20 | 0-202 |

FIG. 12

MATCHED SPECTRAL NULL TRELLIS CODES FOR PARTIAL RESPONSE CHANNELS

CROSS REFERENCE TO RELATED APPLICATIONS

U.S. applications Ser. Nos. 07/169,918 and 07/169,919, filed concurrently with this application, disclose other techniques for improving coding gain on partial response channels and different most probable sequence calculations for the outputs.

TECHNICAL FIELD

This invention relates to techniques for transmission of binary digital data over partial response channels using maximum likelihood sequence detection (PRML). More particularly, it relates to trellis codes for PRML channels which achieve significant coding gain at high rates with reduced hardware requirements.

BACKGROUND OF THE INVENTION

The following prior art references are considered by applicants to be the most pertinent to the present invention:

[A] J. K. Wolf and G. Ungerboeck, "Trellis coding for partial-response channels", IEEE Trans. Comm., Vol. COM-34, No. 8, August 1986, pp. 765–773.

[B] T. A. Lee and C. Heegard, "An Inversion Technique for the Design of Binary Convolutional Codes for the $1-D^N$ Channel", Proc. IEEE Regional Meeting, Johns Hopkins, February 1985.

[C] A. R. Calderbank, C. Heegard and T. A. Lee, "Binary convolutional codes with application to magnetic recording", IEEE Trans. Info. Th., Vol. IT-32, No. 6, November 1986, pp. 797–815.

[D] H. Thapar and A. Patel, "A Class of Partial Response Systems for Increasing Storage Density in Magnetic Recording", presented at Intermag 1987, Tokyo, Japan.

[E] R. Wood, "Viterbi Reception of Miller-Squared Code on a Tape Channel", Proceedings of IERE Video and Data Recording Conference, Southampton, England, 1982.

[F] K. Immink and G. Beenker, "Binary transmission codes with higher order spectral zeros at zero frequency", IEEE Trans. Info. Th., Vol. 33, No. 3, May 1987, pp. 452–454.

Reference [E] demonstrates the use of a simplified Viterbi detector in conjunction with the rate ½, Miller-squared code on a full response tape channel. The code has a spectral null at zero frequency, implying bounded accumulated charge, and the receiver operates with a degenerate state diagram which tracks only the accumulated charge. Coding gain arises from the fact that the code has minimum free Hamming distance 2, versus the minimum distance of 1 for uncoded binary data.

Reference [F] describes binary codes wherein both the code power spectral density and its low order derivatives vanish at zero frequency, and the minimum Hamming distance of a K-th order zero-disparity code is at least $2(K+1)$.

The techniques heretofore disclosed, including those in above-cited references [A], [B], [C], [E] and [F], do not teach the application of trellis codes with K-th order spectral zeros to enable high-rate reliable transmission on partial response channels. Nor do they describe methods for obtaining enhanced coding gain by exploiting the memory inherent in the partial response channel function.

There is a need for techniques which can provide high rate codes that improve upon those found in the prior art by enabling significantly reduced hardware requirements, particularly in the maximum-likelihood detector, for specified coding gains. In addition, such techniques should provide high rate codes with significant coding gains suitable for partial response channels, such as disclosed in reference [D], which are not addressed by the prior art techniques.

SUMMARY OF INVENTION

Toward this end and according to the invention, an improved method is described for coding input strings at high rate to improve the coding gain of partial response channels and provide an output of improved reliability. This method involves determining each frequency at which there is a zero in the transfer function of a partial response channel, and encoding an input string into a binary code string having a power spectrum value of zero for each such frequency. (Those frequencies at which the power spectrum value is zero are herein defined as "spectral null frequencies"; i.e., those frequencies at which no energy is transmitted.) A channel output sequence is generated responsively to transmission of the code string through the channel. The most probable code sequence is calculated from the channel output sequence, and decoded to provide the output.

The code strings have the property that the code power spectrum vanishes at those frequencies where the channel transfer function vanishes. This "matching" of spectral null frequencies produces enhanced coding gains by exploiting the memory inherent in the channel. Additional coding gain is achieved by increasing the order of the spectral null of the code strings at these frequencies.

Hardware requirements are reduced by means of a detector which keeps track of only the frequency spectral content of the code strings. This simplified detector achieves substantially the performance of a full maximum likelihood detector for the code.

DESCRIPTION OF PREFERRED EMBODIMENTS GENERAL

According to the invention, an improved method is described for constructing high rate (e.g., ⅔, ¾, 4/5) trellis codes for partial response channels. Several new codes are described for channels with transfer polynomials of the form $(1-D)^M(1+D)^N$, with emphasis on the cases of greatest current interest in magnetic and optical data recording: namely, dicode (1−D), class 4 $(1-D^2)$, extended class 4 $(1-D)(1+D)^2$, class 1 (1+D), and class 2 $(1+D)^2$. The improved method is also applicable to a $(1-D)^2$ partial response channel.

This improved method utilizes a unique principle herein referred to as "matched spectral nulls": i.e., the trellis code spectrum is designed to have nulls at frequencies where the channel transfer function has a null, thereby providing improved coding gains and reduced Viterbi decoder complexity.

Figure 1:
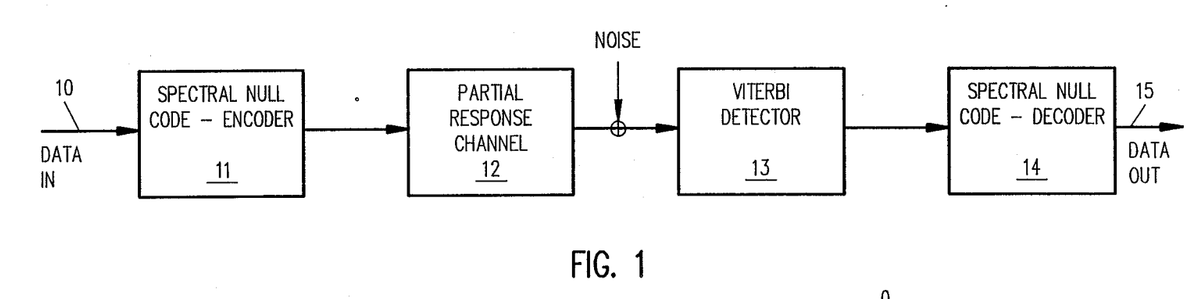
FIG. 1 is a block diagram of a recording system employing a trellis coding technique according to the invention.

As depicted in FIG. 1, input data, such as in the form of binary symbol strings, is transmitted from a bus 10 to an encoder 11. Encoder 11 produces a binary code symbol sequence which serves as input to a partial response channel 12. This code has a power spectrum of zero for each frequency at which there is a zero in the transfer function of the channel 12; i.e., the code sequences have spectral nulls which match those of the partial response channel. A channel output sequence is generated by partial response channel 12 and detected at the channel output by a detector 13. This detector calculates the most probable code sequence from the channel output sequence. Detector 13 reduces computational and hardware requirements by tracking only the frequency spectral content of the channel output sequence, thereby producing a near maximum-likelihood estimate (or most probable code sequence) of the transmitted original data sequence supplied via bus 10. A decoder 14 then generates from the detected sequence the matched spectral null code output data in a bus 15.

This code format and code detection technique are founded on an analysis of Euclidean distance properties of partial response output sequences generated by inputs satisfying the matched spectral null constraints, which will now be briefly described.

Figure 2:
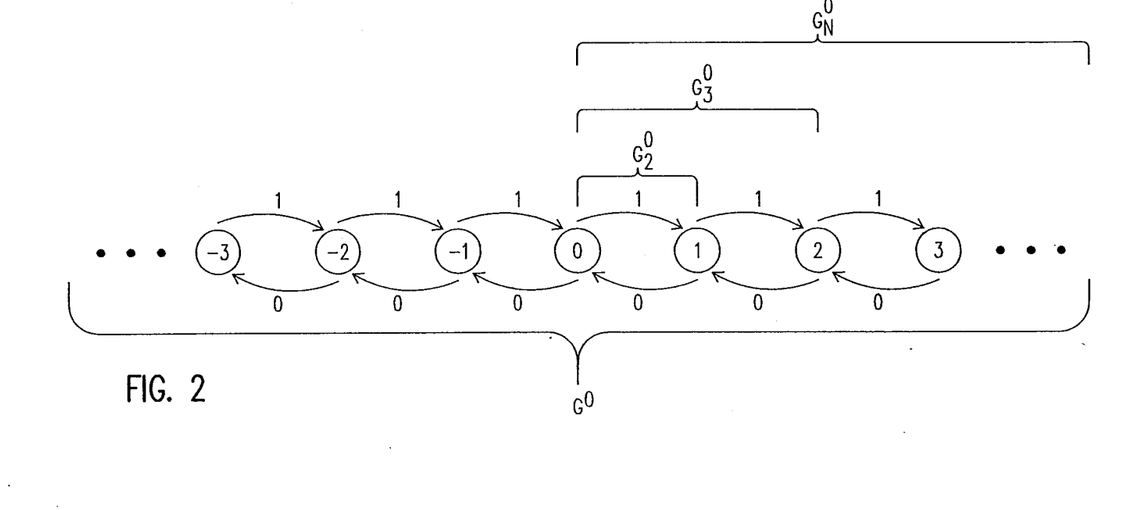
FIG. 2 is a canonical state diagram for binary sequences having a spectral null at zero frequency; i.e., where $f=0$.
Figure 3:
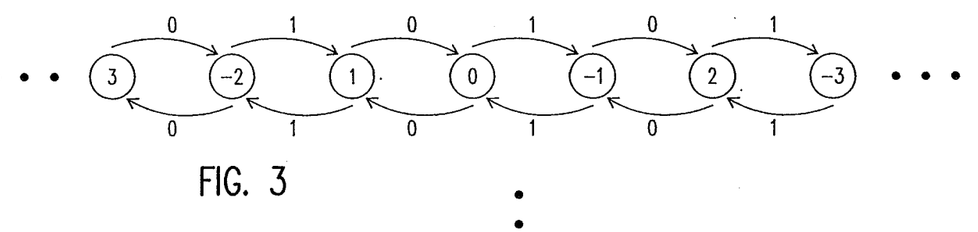
FIG. 3 is a canonical state diagram for binary sequences having a spectral null at one-half the Nyquist frequency; i.e., where $f=\frac{1}{2}T$ and T is the code symbol period.
Figure 4:
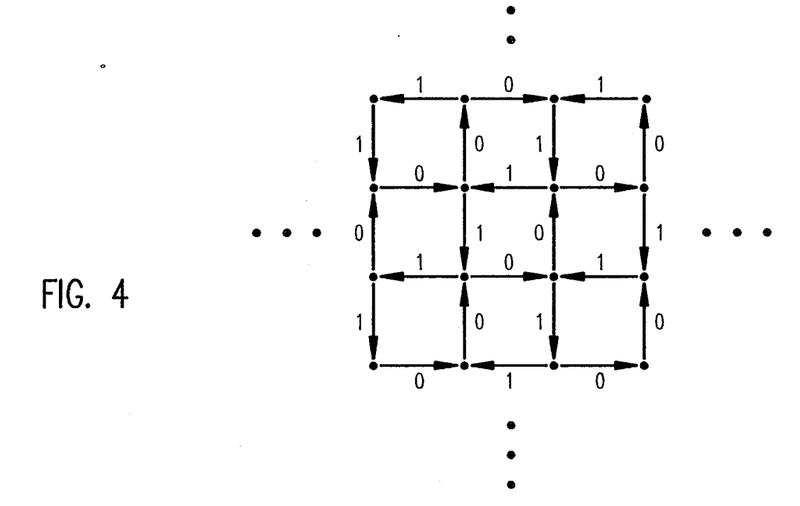
FIG. 4 is a canonical state diagram for binary sequences having simultaneous spectral nulls both at zero frequency ($f=0$) and at one-half the Nyquist frequency ($f=\frac{1}{2}T$)

Binary sequences with spectral null constraints are described in the literature by so called "canonical state diagrams" comparable to those in FIGS. 2-4. Specifically, for frequencies $f_1, \ldots, f_n$, the canonical diagram $G^{f_1,\ldots,f_n}$ is a countable state diagram with edge labels from the binary alphabet which satisfies these requirements:

1. Every finite subdiagram generates a set of sequences with spectral nulls at $f_1, \ldots, f_n$.

2. Any finite state diagram which produces nulls at $f_1, \ldots, f_n$ can be suitably "collapsed" in a label-preserving manner to a subdiagram of $G^{f_1,\ldots,f_n}$.

The canonical diagram, denoted $G^0$, for a null at zero frequency, f=0, is shown in FIG. 2. The diagram, denoted $G^{½T}$, for a null at one-half the Nyquist frequency, f=½T, where T is the code symbol period, is shown in FIG. 3. The canonical diagram, denoted $G^{0,½T}$, for simultaneous nulls at f=0 and f=½T is shown in FIG. 4.

$G_N^0$ and $G_N^{½T}$ denote the subdiagrams of $G^0$ and $G^{½T}$ which contain N consecutive states. The notation $G_N^{0,½T}$ refers to the subdiagram of $G^{0,½T}$ with states forming an N by N square.

The Appendix shows the derivation of the novel bounds on the free Euclidean distance $d^2_{free}$ of the channel output sequences, which translate into the coding gains provided by matched spectral null codes in the presence of additive white Gaussian noise. These bounds validate the coding technique depicted in FIG. 1. Specifically, these coding gain bounds are as follows:

Bound 1 (simple channel null): For the dicode (and class 1) partial response channel, the minimal trellis describing the output sequences produced by the input constraint diagram $G_N^0$ (and $G_N^{½T}$, respectively) satisfies the condition:

$$\text{for } N = 3, \; d^2_{free} = 6 \text{ (4.8 dB gain)}$$

$$\text{where } 4.8 \text{ dB} = 10 \times \log_{10} \frac{d^2_{free} \text{ [coded]}}{d^2_{free} \text{ [uncoded]}} = 10 \times \log_{10} \frac{6}{2}$$

$$\text{for } N \geq 4, \; d^2_{free} = 4 \text{ (3.0 dB gain)}$$

$$\text{where } 3.0 \text{ dB} = 10 \times \log_{10} \frac{d^2_{free} \text{ [coded]}}{d^2_{free} \text{ [uncoded]}} = 10 \times \log_{10} \frac{4}{2}$$

Note: The dB gain is similarly calculated for the following Bounds.

Bound 2 (First order channel null): For the $(1-D)^2$ (and class 2) partial response channel, the minimal trellis describing the output sequences produced by the input constraint diagram $G_N^0$ (and $G_N^{½T}$, respectively) satisfies the condition:

for N=3, $d^2_{free}$=20(7.0 dB gain)
for N=4,5, $d^2_{free}$=10(4.0 dB gain)
for N≧6, $d^2_{free}$=6(1.8 dB gain).

Bound 3 (Simultaneous nulls): For the extended class 4 partial response channel, the minimal trellis describing the output sequences produced by the input constraint diagram $G_N^{0,½T}$ satisfies the condition:

for N=3, $d^2_{free}$=12(4.8 dB gain)
for N=4, $d^2_{free}$=8(3.0 dB gain)
for N≧5, $d^2_{free}$≧6(1.8 dB gain)

These bounds specify the coding gains which are achievable by high rate trellis codes with matched spectral null constraints. In order to realize this coding gain in practice, a synchronous code with, preferably, a finite-state encoder, such as 11, and sliding block decoder, such as 14, is required which transforms arbitrary binary data into code sequences generated by the constrained diagrams depicted in FIG. 2, 3 and 4.

As previously noted, FIG. 2 depicts a canonical state diagram for binary sequences with a spectral null at zero frequency wherein the sequences are generated in one coordinate (i.e., x) direction; FIG. 3 depicts a canonical state diagram for binary sequences with a spectral null at ½T, where T is the code symbol period; and FIG. 4 depicts a canonical state diagram for binary sequences with spectral nulls at zero frequency and at ½T. FIG. 4 is a canonical state diagram wherein the sequences are generated in two coordinate (i.e., x and y) directions, employing the k-way interleaving technique disclosed in U.S. Pat. No. 4,567,464 assigned to the assignee of the present invention.

The capacity of a constrained system of sequences is the maximum achievable rate of a code satisfying the specified constraints. The published sliding block code construction methods of Adler-Coppersmith-Hassner and Karabed-Marcus form no part of the present invention, but can be used to construct codes at rates arbitrarily close to the capacity. The capacity $C_N$ of the diagrams $G_N{}^0$, $G_N{}^{\frac{1}{2}T}$ and $G_N{}^{0,\frac{1}{2}T}$ is given by:

$$C_N = \log_2 2\cos\frac{\pi}{N+1}$$

so it will be understood that for any desired rate $k/n < 1$, a value of N can be selected large enough to permit the construction of a rate $k/n$ spectral null code with that rate.

If the minimal trellis corresponding to output sequences generated by the canonical diagrams is used as the underlying trellis structure for Viterbi detection, the coding gain is given by Bounds 1, 2 and 3 above.

Note that the codes incorporate limitations on the maximum run-length of zero output samples so that only those code strings having less than a predetermined number of consecutive zeroes in their output channel sequences are produced in order to improve timing and gain control decisions during detection. Also, only the code strings having a predetermined level of reliability are produced; and a finite-state encoder and sliding block decoder are constructed for a code satisfying these maximum run-length constraints on zero samples, as well as eliminating "quasi-catastrophic" sequences which might degrade the worst case coding gain. (Quasi-catastrophic sequences are those represented by more than one distinct path through the state diagram describing the constraint).

Reduced complexity Viterbi detectors are illustrated for ⅔, ¾ and 4/5 codes, with underlying trellis structures derived from the canonical state diagrams; however, detectors for use with other selectable codes can be easily derived by the method illustrated herein. To simplify the detector further, and to permit high speed detection in which more than one code bit is detected per detection cycle, the trellis is derived from the p-th power of the state diagram. (The p-th power of a state diagram G is the state diagram H with the same states as G, and an edge from state $s_i$ to $s_j$ for each path of length p in G from $s_i$ to $s_j$. The edge label in H is the sequence of p symbols generated by the corresponding length p path in G). In the cases of interest, the power p is chosen to be the period of the diagram, which is the greatest common divisor of cycle lengths in the diagram. For the diagrams $G_N{}^0$ and $G_N{}^{\frac{1}{2}T}$, the period is 2. For the diagrams $G_N{}^{0,\frac{1}{2}T}$, the period is 4.

Similar techniques can be used to generate matched spectral null trellis codes with larger coding gains by utilizing codes with higher order spectral nulls; that is, zeros in the power spectrum as well as in a sequence of its lower order derivatives. In the Appendix, a proof is set forth of the novel general bound on the free Euclidean distance of channel output sequences when the matched spectral null code and/or partial response channel has higher order spectral nulls at the matched null frequencies.

Bound 4 (Higher order nulls): For a channel with K-th order null at zero frequency or one-half the Nyquist frequency, the minimal trellis describing the output sequences produced by the constraint diagram for sequences with a matched spectral null of order L satisfies the condition:

$$d^2_{free} \geq 2(K+L+1).$$

This bound shows that the matched spectral null codes exploit the distance properties provided by the channel transfer function nulls, since the resulting minimum distance is a linear function of the sum of the orders of the code and channel nulls. This result translates into bounds on coding gains which are achieved by higher order matched spectral nulls. For example, a matched spectral null of order 1 on the dicode channel provides a minimum coding gain of 4.8 dB.

Applications of ½, ⅔, ¾ and 4/5 Codes

Details are now given for methods of implementing codes with rates ⅔, ¾ and 4/5 for the $(1\pm D^N)$ and $(1\pm D)^2$ channels, with coding gains 3 dB for the first group of channels, and gains 4 dB, 3 dB and 1.8 dB for the second group. The codes can also be applied via interleaving to the $(1-D)(1+D)^2$ channel to get coding gains of 3 dB, 1.8 dB and 1.8 dB.

In the case of $(1\pm D^N)$ channels, the new codes significantly reduce the Viterbi decoder complexity required to achieve coding gains on the order of 3 dB, compared to the codes obtained by previous methods proposed by Reference [A] and Reference [C]. In addition, the unique method provides a way to construct families of high rate codes for channels which were not addressed by earlier methods; namely, those with transfer polynomials other than $(1\pm D^N)$.

Rate ½ Codes

The biphase code for the dicode channel previously published in Reference [C] is generated immediately by the matched spectral nulls technique, representing a special case. Specifically, the biphase code is described exactly by the subdiagram $G_3{}^0$. This subdiagram has capacity precisely 0.5, and, in this case, the biphase code provides a 100% efficient (rate ½) code with particularly simple block code structure. The coding gain of the code over the uncoded channel, namely 4.8 dB, is given by Bound 1. Bound 2 gives a new application for the biphase code on the $(1-D)^2$ channel, providing a 7 dB coding gain over the uncoded channel. In this case, the trellis diagram derived from the second power of $G_3{}^0$ provides the structure for a full maximum-likelihood decoder since the code is 100% efficient.

Rate ⅔ Codes

For a rate ⅔ code with spectral null at zero frequency, for use with dicode and $(1-D)^2$ channels, the minimum state diagram with adequate capacity is $G_4{}^0$, which has capacity C=0.694 . . . .

Table 1 shows a 3-state constrained system derived from the 6th power of $G_4{}^0$. The box in row i and column j in the table contains a letter which identifies a list of allowable 6-bit codewords which can originate in state i and terminate in state j. The number in parentheses indicates the number of codewords in the list. The 6-bit codewords in the list are given below the table.

TABLE 1

| A(4) | B(8) | B(8) |
|---|---|---|
| C(8) | D(4) | D(4) |
|  | E(2) U F(7) | F(7) |

Constrained system for rate 4/6 code
with spectral null at f = 0

A - 101100 110010 110100 111000
B - 101011 101101 101110 110011 110101 110110 111001 111010
C - 001010 001100 010010 010100 011000 100010 100100 101000
D - 001011 001101 001110 010011
E - 010101 101010
F - 010110 011001 011010 100011 100101 100110 101001

For the dicode channel or $(1-D)^2$ channel, a rate 4/6 finite state encoder is derived by selecting 16 codewords originating from each state and then assigning the 16 distinct 4-bit data words to corresponding codewords. A preferred embodiment is given in Table 2. It is derived from Table 1 by eliminating from row 1 the codewords in list A, and then assigning in a specific manner the 16 distinct 4-bit data words to the 16 codewords originating from each state. The assignment specified here was chosen to simplify the Boolean function which gives the data to codeword correspondence.

Entries in the table are in the form $c_1c_2c_3c_4c_5c_6/t_1t_2$ where $c_1c_2c_3c_4c_5c_6$ is the codeword generated, and $t_1t_2$ is the next encoder state.

TABLE 2

| State $s_1s_2$ Data $b_1b_2b_3b_4$ | 00 | 10 | 11 |
|---|---|---|---|
| 0000 | 101011/10 | 001010/00 | 010110/10 |
| 0001 | 101101/10 | 001100/00 | 011001/10 |
| 0010 | 101110/10 | 010010/00 | 011010/10 |
| 0011 | 110011/10 | 010100/00 | 100011/10 |
| 0100 | 110101/10 | 011000/00 | 100101/10 |
| 0101 | 110110/10 | 100010/00 | 100110/10 |
| 0110 | 111001/10 | 100100/00 | 101001/10 |
| 0111 | 111010/10 | 101000/00 | 101010/10 |
| 1000 | 101011/11 | 001011/10 | 010110/11 |
| 1001 | 101101/11 | 001101/10 | 011001/11 |
| 1010 | 101110/11 | 001110/10 | 011010/11 |
| 1011 | 110011/11 | 010011/10 | 100011/11 |
| 1100 | 110101/11 | 001011/11 | 100101/11 |
| 1101 | 110110/11 | 001101/11 | 100110/11 |
| 1110 | 111001/11 | 001110/11 | 101001/11 |
| 1111 | 111010/11 | 010011/11 | 010101/10 |

Encoder table for rate 4/6 code
with spectral null at f = 0
Table entries = "codeword/next state"

The corresponding sliding block decoder is given in Table 3. Entries in the table are in the form $c_1c_2c_3c_4c_5c_6/L$ where $c_1c_2c_3c_4c_5c_6$ is the received codeword, and L represents the look-ahead decision bit. This bit is a function of the codeword $c_7c_8c_9c_{10}c_{11}c_{12}$, given by:

$$L = c_7(c_8 + c_9c_{10}) + c_{12}(c_{11} + c_9c_{10})$$

The symbol "—" denotes a "don't care" value. In the data column, $b_1b_2b_3b_4$ represents the decoded data.

TABLE 3

| Codeword\|L $c_1c_2c_3c_4c_5c_6$\|L | Data $b_1b_2b_3b_4$ | Codeword\|L $c_1c_2c_3c_4c_5c_6$\|L | Data $b_1b_2b_3b_4$ |
|---|---|---|---|
| 101011\|1 | 0000 | 101011\|0 | 1000 |
| 101101\|1 | 0001 | 101101\|0 | 1001 |
| 101110\|1 | 0010 | 101110\|0 | 1010 |
| 110011\|1 | 0011 | 110011\|0 | 1011 |
| 110101\|1 | 0100 | 110101\|0 | 1100 |
| 110110\|1 | 0101 | 110110\|0 | 1101 |
| 111001\|1 | 0110 | 111001\|0 | 1110 |
| 111010\|1 | 0111 | 111010\|0 | 1111 |
| 001011\|1 | 1000 | 001011\|0 | 1100 |
| 001101\|1 | 1001 | 001101\|0 | 1101 |
| 001110\|1 | 1010 | 001110\|1 | 1110 |
| 010011\|1 | 1011 | 010011\|0 | 1111 |
| 010110\|1 | 0000 | 010110\|0 | 1000 |
| 011001\|1 | 0001 | 011001\|0 | 1001 |
| 011010\|1 | 0010 | 011010\|0 | 1010 |
| 100011\|1 | 0011 | 100011\|0 | 1011 |
| 100110\|1 | 0101 | 100110\|0 | 1101 |
| 101001\|1 | 0110 | 101001\|0 | 1110 |
| 001010\|— | 0000 | 001100\|— | 0001 |
| 010010\|— | 0010 | 010100\|— | 0011 |
| 011000\|— | 0100 | 100010\|— | 0101 |
| 100100\|— | 0110 | 101000\|— | 0111 |
| 101010\|— | 0111 | 010101\|— | 1111 |

Sliding block decoder for rate 4/6 code
with spectral null at f = 0

The encoder and decoder can be reduced to hardware by conventional techniques, using a ROM-based approach or a Boolean logic implementation.

Figure 5:
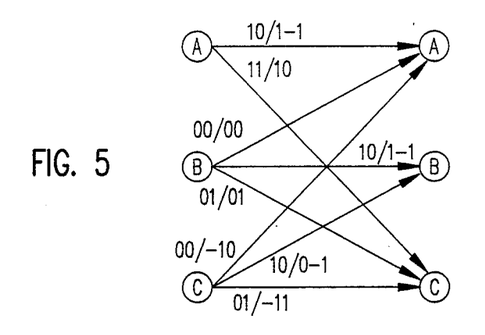
FIG. 5 is a detector trellis for rate ⅔ trellis code on a dicode $(1-D)$ channel.

FIG. 5 shows the reduced complexity detector trellis for the rate 4/6 code on the dicode channel, derived from the second power of $G_4^0$ by incorporating the effect of the channel. This 3-state trellis provides the structure for the Viterbi detection algorithm, which is derived by conventional techniques. The code provides a coding gain of 3 dB (see Bound 1).

The code can be applied in an interleaved manner on interleaved dicode channels, providing the same coding gain of 3 dB.

Figure 6:
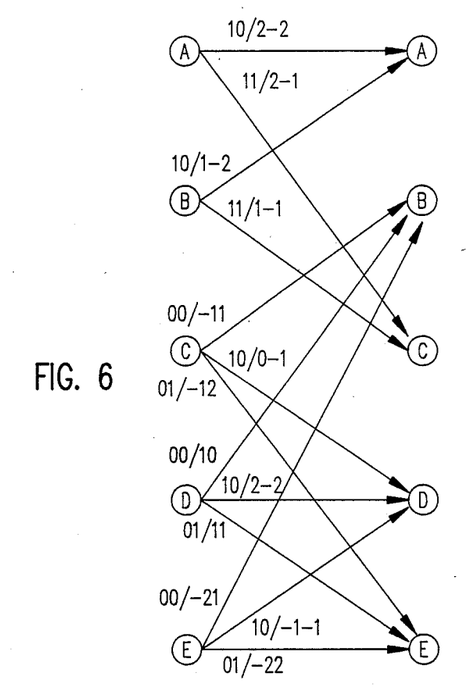
FIG. 6 is a detector trellis for rate ⅔ trellis code on a $(1-D)^2$ channel.

FIG. 6 depicts the trellis structure for the Viterbi detector when used on the $(1-D)^2$ channel. The code provides a coding gain of 4 dB (see Bound 2).

Figure 7:
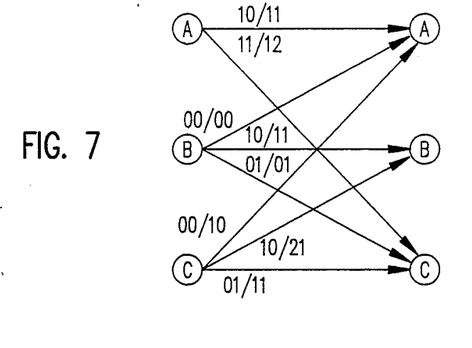
FIG. 7 is a detector trellis for rate ⅔ trellis code on a class 1 $(1+D)$ channel.
Figure 8:
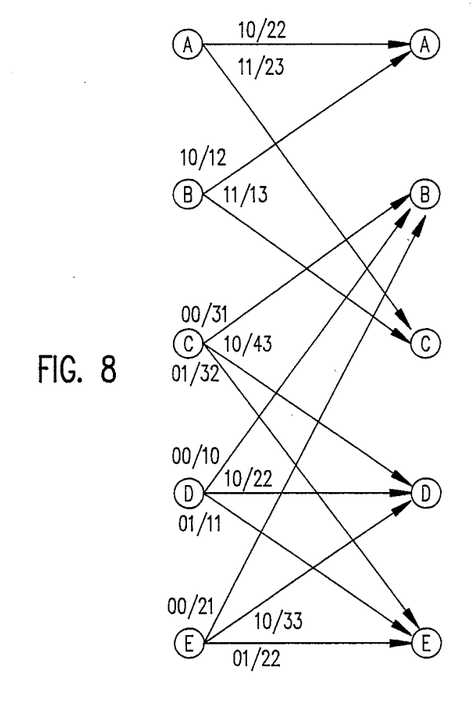
FIG. 8 is a detector trellis for rate ⅔ trellis code on a class 2 $(1+D)^2$ channel.

FIGS. 7 and 8 depict the Viterbi detector trellis structures for the class 1 and class 2 applications, respectively, of the modified code. For the class 1 and class 2 channels, the matched spectral null subdiagram $G_4^{\frac{1}{2}T}$ is the minimum state diagram which generates the required spectral null at one-half the Nyquist frequency. The code derived above can be converted for use on the class 1 or class 2 channels by adding (modulo 2) the vector $v=010101\ldots$ or $v=101010\ldots$ to the output of the encoder in Table 1. This modified code is decoded by adding (modulo 2) the same vector $v$ to the detected codestream, and then passing the result to original decoder of Table 2. The modified code provides coding gains of 3 dB for class 1 and 4 dB for class 2, respectively.

The modified code can be applied in an interleaved manner on interleaved class 1 channels, providing the same coding gain of 3 dB.

Figure 9:
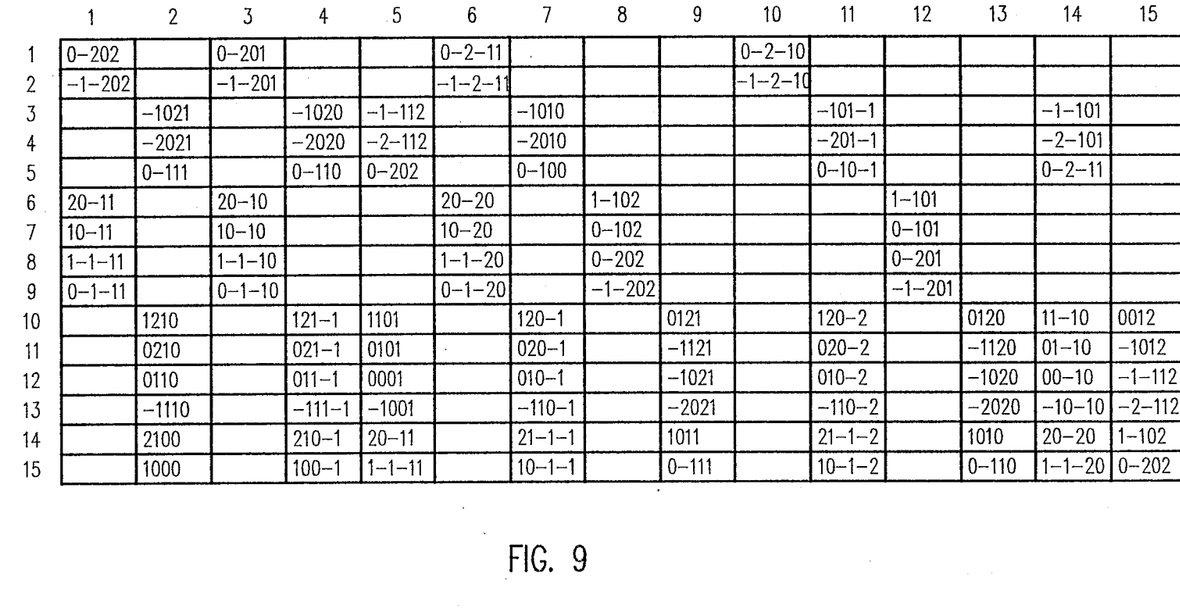
FIG. 9 is a tabular representation of a detector trellis for rate ⅔ trellis code on an "extended" class 4 (1−D)(1+D)² channel.

FIG. 9 is a tabular representation of a 15-state Viterbi detector trellis. This is required when the code is applied in an interleaved fashion to the extended class 4 channel, with transfer polynomial $(1-D)(1+D)^2$. It is based upon the fourth power of the diagram $G_4^{0,\frac{1}{2}T}$. The code provides a 3 dB coding gain (see Bound 3).

Rate ¾ Codes

For a rate ¾ code with spectral null at zero frequency, for use with dicode and $(1-D)^2$ channels, the minimum state diagram with adequate capacity is $G_5^0$, which has capacity C=0.792....

Table 4 shows a two state constrained system derived from the 8th power of $G_5^0$. The box in row i and column j in the table contains a letter which identifies a list of allowable 8-bit codewords which can originate in state i and terminate in state j. The number in parentheses indicates the number of codewords in the list. Using the notation $\overline{A}$ to denote the list which is obtained by bit-wise complementing (that is, adding 11111111 modulo 2) each codeword in list A, it can be seen that $C=\overline{B}$ and $D=\overline{A}$. The 8-bit codewords in each list are given below the table in hexadecimal form, each codeword being described by a pair of hex symbols.

TABLE 4

|  | A(25) | B(40) |
|---|---|---|
|  | C(40) | D(25) |

List A
78 71 72 B4 74 B2 B1 B8 5C AC 9C 6C
C6 C9 CA C5 D8 D1 D2 E4 D4 E2 E1 E8
List B
97 9E 9D B9 9B D9 E9 79 A7 AE AD BA
AB DA EA 7A B3 D3 E3 73 C7 CE CD CB
57 5E 5D B5 5B D5 E5 75 67 6E 6D B6
6B D6 E6 76
List C
68 61 62 46 64 26 16 86 58 51 52 45
54 25 15 85 4C 2C 1C 8C 38 31 32 34
A8 A1 A2 4A A4 2A 1A 8A 98 91 92 49
94 29 19 89
List D
87 8E 8D 4B 8B 4D 4E 47 A3 53 63 93
39 36 35 3A 27 2E 2D 1B 2B 1D 1E 17
Constrained system for rate 6/8 code
with spectral null at f = 0

There are 65 distinct words in each of rows 1 and 2 of the table. For a rate 6/8 code, any $2^6=64$ codewords are selected from each row. Independently of the data word to codeword assignment selected, the corresponding decoder will be a block decoder, decoding each 8-bit codeword directly into a unique 6-bit data word.

For the dicode channel or $(1-D)^2$ channel, Table 5 gives a specific assignment of the 64 distinct 6-bit data words, each represented by a pair of octal symbols, to a specific subset of 64 codewords from row 1 of the table, corresponding to the codewords originating from state 1. The codeword represented by the hex symbols CC has been omitted. In the table, the notation "UV×WYZ" refers to the words "UV UW UY VW VY VZ" in the specific order indicated.

TABLE 5

| 5 6 1 2 4 X 0 4 2 1 → | 5 6 9 A C X 7 B D E |
|---|---|
| 5 6 1 2 3 X 7 → | 7 X 5 6 9 A 3 |
| 5 6 1 2 3 X 3 → | B X 5 6 9 A 3 |
| 5 6 1 2 3 X 5 → | D X 5 6 9 A 3 |
| 5 6 1 2 3 X 6 → | E X 5 6 9 A 3 |
| 3 X 0 4 2 1 → | 5 6 9 A X C |
| 4 X 7 3 5 6 → | C X 5 6 9 A |
| 0 X 1 2 4 0 → | 7 X 1 2 4 8 |
| 0 X 6 5 3 7 → | B X 1 2 4 8 |
| 7 X 1 2 4 0 → | D X 1 2 4 8 |
| 7 X 6 5 3 7 → | E X 1 2 4 8 |

Data to codeword assignment for encoder state 1
of rate 6/8 code with spectral null at f = 0

The subset and assignment for row 2, representing state 2, are obtained by bit-wise complementing the codewords from row 1. In terms of hex symbol substitutions, this translates to:

0↔F; 1↔E; 2↔D; 3↔C; 4↔B; 5↔A;
6↔9; 7↔8.

The next state information is derived from Table 4.

The block decoder is also derived from the assignments of Table 5 by reading from right to left. The encoder and decoder can be reduced to hardware by conventional techniques, using a ROM-based approach or a Boolean logic implementation.

Figure 10:
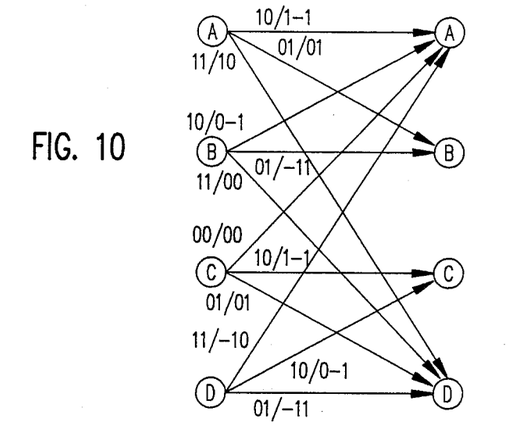
FIG. 10 is a detector trellis for rate ¾ trellis code on a dicode (1−D) channel.

FIG. 10 shows the reduced complexity detector trellis for the rate 6/8 code on the dicode channel, derived from the second power of $G_5^0$ by incorporating the effect of the channel. This 5-state trellis provides the structure for the Viterbi detection algorithm. The code provides a coding gain of 3 dB (see Bound 1).

The code can be applied in an interleaved manner on interleaved dicode channels, providing the same coding gain of 3 dB.

When used on the $(1-D)^2$ channel, the Viterbi trellis structure is derived from the second power of $G_5^0$, in an analogous fashion to the trellis derivations above. The code provides a coding gain of 3 dB (see Bound 2).

For the class 1 and class 2 channels, the matched spectral null subdiagram $G_5^{\frac{1}{2}T}$ is the minimum state diagram which generates the required spectral null at one-half the Nyquist frequency. The rate 6/8 code is converted for use on the class 1 or class 2 channels by adding (modulo 2) the vector $\nu=010101$ . . . or $\nu=101010$ . . . to the output of the encoder in Table 3. This modified code is decoded by adding (modulo 2) the same vector $\nu$ to the detected codestream, and then passing the result to original decoder of Table 4.

It will be clear to those skilled in the art how to then derive the Viterbi detector trellises for the class 1 and class 2 applications. The coding gain for the modified 6/8 code on both the class 1 and class 2 channels is 3 dB.

The modified code can be applied in an interleaved manner on interleaved dicode channels, providing the same coding gain of 3 dB.

When applied in an interleaved fashion to the extended class 4 channel, the code provides a coding gain of 1.8 dB (see Bound 3). It will now be understood by those skilled in the art that the Viterbi detector trellises for the extended class 4 application can be derived in the same manner as described in the last paragraph of the section describing the Rate ⅔ codes.

Rate 4/5 Codes

For a rate 4/5 code with spectral null at zero frequency, for use with dicode and $(1-D)^2$ channels, the minimum state diagram with adequate capacity is $G_6^0$, which has capacity C=0.833 . . . . However, to simplify the sliding block code, the state diagram $G_7^0$ is used. As illustrated herein, the 4/5 code eliminates most, but not all, of the quasi-catastrophic sequences, in order to reduce the encoder complexity. It has capacity C=0.885 . . . .

Table 6 shows a four state constrained system derived from the 10th power of $G_7^0$. The box in row i and column j in the table contains a letter which identifies a list of allowable 10-bit codewords which can originate in state i and terminate in state j. The number in parentheses indicates the number of codewords in the list. The notation $\overline{A}$ is used to denote the list which is obtained by bit-wise complementing (that is, adding 1111111111 modulo 2) each codeword in list A. The 10-bit codewords in lists A, B and D are described below the table.

TABLE 6

|  |  | A(128) | A(128) |
|---|---|---|---|
| D(162) |  | B(62) | B(62) |
| $\overline{A}$(128) | $\overline{A}$(128) |  |  |
| $\overline{B}$(62) | $\overline{B}$(62) | D(162) |  |

TABLE 6-continued
Constrained system for rate 8/10 code
with spectral null at f = 0

Given binary $x = x_1x_2\ldots x_{10}$, let $w(x)$ denote the Hamming weight of x, that is, the number of symbols 1 in x.
S = {x|x is a word in $G_7^0$ from state 3 to state 5}.
B = {xεS|w($x_1,x_2,\ldots,x_8$) = 4}.
A = S-B (the set complement of B in S)
D = {x|x represents a quasi-catastrophic word from state 3 to itself}
The size of the lists are: |S| = 190, |A| = 128, |B| = 62, |D| = 162.

For a rate 8/10 code, any $2^8 = 256$ codewords are selected from each row. Table 7 gives a structured assignment of the 256 distinct 8-bit data words, to the specific subsets of 256 codewords selected from the rows of the table. The set DD can be any subset of 132 words from the 162 words in list D.

TABLE 7

| Y/DD | | X/A<br>$Z^c$/B | $X^c$/A<br>Z/B |
|---|---|---|---|
| X/$\overline{A}$ | $X^c/\overline{A}$ | | |
| $Z^c/\overline{B}$ | Z/$\overline{B}$ | Y/DD | |

Structured data to codeword assignment
for rate 8/10 code

X  $X^c = [0,1]^8$
X  $X^c$ = 0 (i.e., are disjoint)
Z  $Z^c$  Y = $[0,1]^8$
Z,$Z^c$,Y are pairwise disjoint.
The size of the data word lists are: |X| = 128, |Z| = 62, |Y| = 132.

The decoder is also derived from the assignments of Table 7. The decoding rules, involving look-ahead of one codeword, are given in Table 8. The decoder is a sliding block decoder, producing 8 data bits for each sliding block consisting of two 10 bit codewords, implying a maximum error length of two data bytes.

In Table 8, the current codeword is denoted $y_{n-1}$ and the next codeword is denoted $y_n$. The decoder rules determine which entry of the encoder table to use to decode the current codeword $y_{n-1}$. For example, if condition (1) of Table 8 is satisfied, the current codeword $y_{n-1}$ is an element of $\overline{B}$, the complement of B as defined in Table 6. This current codeword should be decoded according to the data assignment in Row 4, Column 1 of Table 7. In the symbols at the right hand edge of Table 8, the left and right ends of the horizontal line identify the Row and Column of the correct data assignment for the current code word.

TABLE 8

| | | |
|---|---|---|
| 1 | $w(y_{n-1})$ = 4 and $w(y_{n-1}\|_1^8)$ = 4 and $y_n\varepsilon A$ | → $y_{n-1}\varepsilon\overline{B}$<br>$4 \to 1$ |
| 2 | $w(y_{n-1})$ = 4 and $w(y_{n-1}\|_1^8)$ = 4 and $y_n$  $\overline{A}$ | → $y_{n-1}\varepsilon\overline{B}$<br>$4 \to 2$ |
| 3 | $w(y_{n-1})$ = 5 and $w(y_n)$ = 4 | → $y_{n-1}\varepsilon DD$<br>$4 \to 3$ |
| 4 | $w(y_{n-1})$ = 4 and $w(y_{n-1}\|_1^8) \neq$ 4 and $y_n\varepsilon A$ | → $y_{n-1}\varepsilon A$<br>$3 \to 1$ |
| 5 | $w(y_{n-1})$ = 4 and $w(y_{n-1}\|_1^8) \neq$ 4 and $y_n$  $\overline{A}$ | → $y_{n-1}\varepsilon A$<br>$3 \to 2$ |
| 6 | $w(y_{n-1})$ = 6 and $w(y_{n-1}\|_1^8)$ = 4 and $y_n\varepsilon A$ | → $y_{n-1}\varepsilon B$<br>$2 \to 3$ |
| 7 | $w(y_{n-1})$ = 6 and $w(y_{n-1}\|_1^8)$ = 4 and $y_n$  $\overline{A}$ | → $y_{n-1}\varepsilon B$<br>$2 \to 4$ |
| 8 | $w(y_{n-1})$ = 5 and $w(y_n)$ = 6 | → $y_{n-1}\varepsilon DD$<br>$2 \to 1$ |
| 9 | $w(y_{n-1})$ = 6 and $w(y_{n-1}\|_1^8) \neq$ 4 and $y_n\varepsilon A$ | → $y_{n-1}\varepsilon A$<br>$1 \to 3$ |
| 10 | $w(y_{n-1})$ = 6 and $w(y_{n-1}\|_1^8) \neq$ 4 and $y_n$  $\overline{A}$ | → $y_{n-1}\varepsilon A$<br>$1 \to 4$ |

Note:
A = {y|w(y) = 6 and $w(y|_1^8) \neq 4$}
A = {y|w(y) = 4 and $w(y|_1^8) \neq 4$}

Sliding block decoder rules for rate 8/10 code

The encoder 11 and decoder 14 can be reduced to hardware by conventional techniques, using a ROM-based approach or a Boolean logic implementation.

Figures 11, 12:
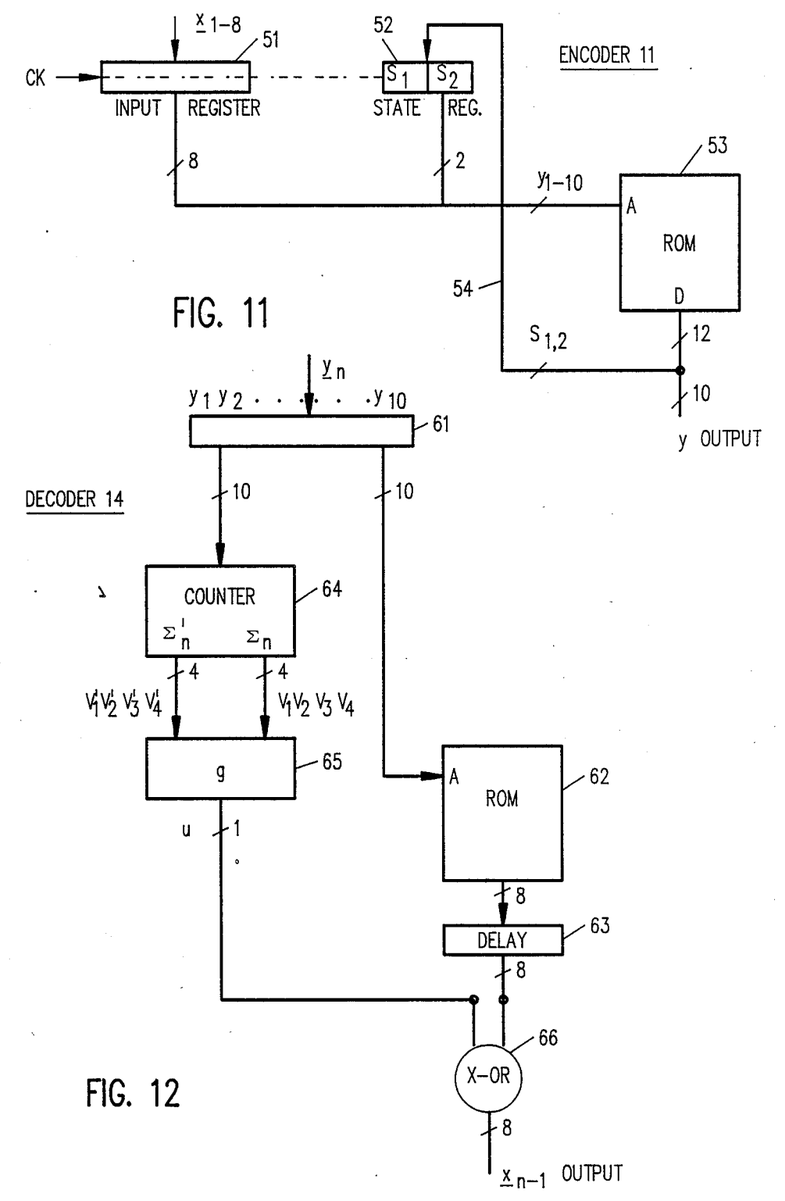
FIG. 11 is an encoder structure for rate 4/5 trellis code on a dicode (1−D) channel.
FIG. 12 is a decoder structure for rate 4/5 trellis code on a dicode (1−D) channel.

For sake of illustration, the finite-state encoder shown in Table 7 may be of the type shown in FIG. 11 comprising an input shift register 51, a state shift register 52, and a read only memory (ROM) 53. Shift registers are two-terminal input/output machines with feed-forward path. Input shift register 51 takes 8 input bits $x_1$, $x_2, \ldots, x_8$ as input at every clock cycle C, and outputs $y_1, y_2, \ldots, y_{10}$ during the cycle C. State register 52 takes 2 bits of state information $s_1$ and $s_2$ as inputs every clock cycle C, and outputs $s_1$ and $s_2$ during the clock cycle C. ROM 53 takes 10-bit (8 input bits+2 state bits) address inputs every cycle C, and provides 12-bit (2 updated state bits+10 output bits) outputs every cycle C. The updated state bits are sent via 54 to the state register for the next cycle C.

For sake of illustration, the sliding block decoder 14 (which, as noted, follows the rules shown in Table 8) may be of the type shown in FIG. 12. This decoder 14 comprises an input shift register 61, a ROM 62, a delay shift register 63, a counter 64, a decision logic g 65 and an 'exclusive-or' logic gate 66. ROM 62 takes a 10-bit input address and has an 8-bit data output. At every clock cycle C, delay register 63 stores the output of the ROM for use at the next clock cycle. At every clock cycle C, input shift register 61 takes 10 input bits $y_1, y_2, \ldots, y_{10}$. The output of input shift register 61 is $y_1, y_2, \ldots, y_{10}$ for the duration of the cycle. This output is connected to counter 64, whose two 4-bit outputs v and v', computed in the same clock cycle, represent the number of ones in $y_1, \ldots, y_{10}$ and in $y_1, \ldots, y_8$, respectively. The output u of the decision logic g is one or zero based on the inputs v and v' to g. The function g is specified to produce output variable u according to the rule:

$$g(v_1,\ldots,v_4,v'_1,\ldots,v'_4) =$$
$$((v_1v_2v_3v_4) + (\overline{v_1v_2v_3v_4}))(v'_1 + v'_2 + v'_3 + v'_4) = u$$

The variable u is one of the inputs to exclusive-or gate 66, whose other input is the 8 bit contents of delay shift register 63 stored from the previous clock cycle. Finally, the output of input shift register 61 addresses ROM 62 to produce an 8-bit data output, which is stored in delay register 63 for the next clock cycle.

Figure 13:
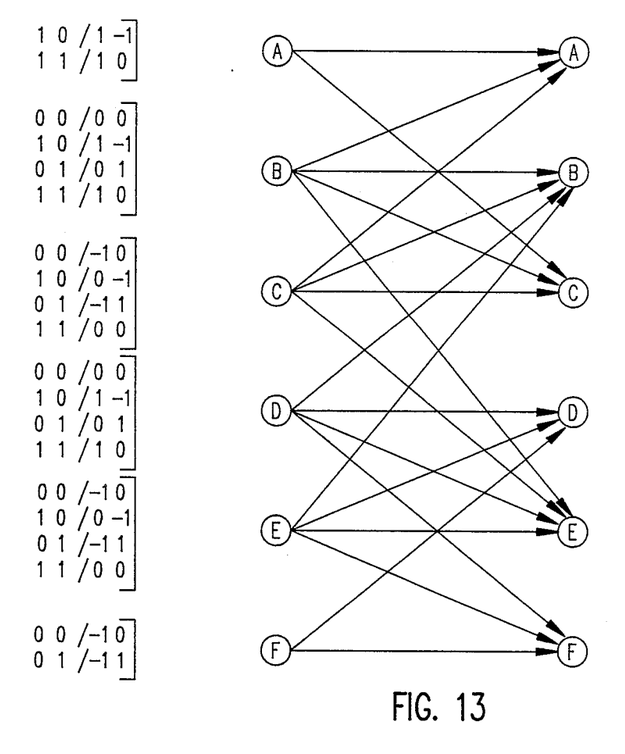
FIG. 13 is a detector trellis for rate 4/5 trellis code on a dicode (1−D) channel.

FIG. 13 shows the reduced complexity detector trellis for the rate 8/10 code on the dicode channel, derived from the second power of $G_7^0$ by incorporating the effect of the channel. This 6-state trellis provides the structure for the Viterbi detection algorithm. The code provides a coding gain of 3 dB (see Bound 1).

According to the invention, in the rate ⅔ and rate ¾ codes as herein described, quasi-catastrophic code sequences have been successfully eliminated. However, in the rate 4/5 code herein described, these quasi-catastrophic sequences have not been eliminated because, as earlier noted, to do so would involve a degree of complexity not warranted by the improved results obtained.

The code can be applied in an interleaved manner on interleaved dicode channels, providing the same coding gain of 3 dB.

When used on the $(1-D)^2$ channel, the Viterbi trellis structure is derived from the second power of $G_7^0$, in an analogous fashion to the trellis derivations above. The code provides a coding gain of 1.8 dB (see Bound 2).

For the class 1 and class 2 channels, the matched spectral null subdiagram $G_6^{\frac{1}{2}T}$ is the minimum state diagram which generates the required spectral null at one-half the Nyquist frequency. As in the dicode case, the state diagram $G_7^{\frac{1}{2}T}$ is used to simplify the resulting code. This diagram has capacity C=0.885 . . . . The rate 8/10 code for the dicode channel is converted for use on the class 1 or class 2 channels by adding (modulo 2) the vector $\nu=010101$ . . . or $\nu=101010$ . . . to the output of the encoder in FIG. 11. This modified code is decoded by adding (modulo 2) the same vector $\nu$ to the detected codestream, and then passing the result to the decoder 14, more fully shown in FIG. 12.

It will be clear to those skilled in the art how to then derive the Viterbi detector trellises for the class 1 and class 2 applications. The coding gain for the modified 8/10 code on the class 1 and class 2 channels are 3 dB and 1.8 dB, respectively.

The modified code can be applied in an interleaved manner on interleaved dicode channels, providing the same coding gain of 3 dB.

When applied in an interleaved fashion to the extended class 4 channel, the code provides a coding gain of 1.8 dB (see Bound 3). Again, the Viterbi detector trellises for the extended class 4 application are derived in the manner described in connection with Rate $\frac{2}{3}$ codes.

Summary—Comparison to Prior Art Codes

Reference [A] describes codes for the (1−D) channel which achieve 3 dB coding gain at rates $\frac{2}{3}$, $\frac{3}{4}$ and 4/5. In Table 9, the parameters of these prior art codes to achieve a 3 dB coding gain are compared to those of the comparable codes presented in this application to provide an identical coding gain. It can be seen that the limitation on the maximum run of zero output samples, denoted Zero-Runlength-Limit (ZRL), is significantly reduced in the new codes. It is also seen that the complexity of the Viterbi detector, measured approximately by the number of edges in one stage of the trellis diagram underlying the detector, is significantly reduced in the new codes. The number of samples detected per detection cycle is given in the "samples/edge" entry for each code.

TABLE 9

| Gain | Rate $\frac{2}{3}$ 3dB | Rate $\frac{3}{4}$ 3dB | Rate 4/5 3dB |
|---|---|---|---|
| ZRL (Prior Art) | 9 | 12 | 22 |
| (New) | 2 | 3 | 5 |
| Edges (Prior Art) | 32 | 64 | 256 |
| (New) | 8 | 12 | 20 |
| Samples/Edges (Prior Art) | 3 | 4 | 5 |
| (New) | 2 | 2 | 2 |

Comparison of prior art codes and new codes providing 3dB gain on (1 - D) channel It will be understood that various changes may be made in the method and techniques for improving coding gain herein described. The embodiments illustrated are therefore to be considered merely as illustrative and the invention is not to be considered limited except as specified in the claims.

APPENDIX

The following Theorem constitutes the basis for the bounds on the coding gains of matched spectral null trellis codes:

Let $e(D) = \sum_{n=0}^{N} e_n D^n$ where $e_n$ are integer-values coefficients, and assume $e_0$ is nonzero. If $e(D)$ is divisible by $(1-D)^K$, then $$\sum_{n=0}^{N} e_n^2 \geq 2K \qquad (A1)$$

That is, the Euclidean weight of the sequence of coefficients of $e(D)$, denoted $|e|^2$, is greater than or equal to 2K.

To prove this, the following lemma, denoted Lemma 1, will be used:

Let $e(D) = \sum_{n=0}^{N} e_n D^n$ where $e_n$ are integer-valued coefficients, and assume $e_0$ is nonzero. If $e(D)$ is divisible by $(1-D)^K$, then the sequence of coefficients $\{e_n\} = e_0 e_1, \ldots, e_N$ has at least K changes in sign. The proof makes use of this inductive argument:

Consider the case K=1. If $e(D)$ is divisible by $(1-D)$, then it follows that $$e(1) = \sum_{n=0}^{N} e_n = 0$$

If all nonzero coefficients were of one polarity, $e(1)$ would be nonzero with that polarity. Therefore, the sequence of coefficients $\{e_n\}$ must have at least one change of sign.

Now, let $e(D)$ be divisible by $(1-D)^K$, with factorization into integer polynomials $e(D)=f(D)(1-D)^K$. Then $g(D)=f(D)(1-D)^{K-1}$ is divisible by $(1-D)^{K-1}$. By the inductive hypothesis, the sequence of coefficients $\{g_n\}$ of $g(D)$ has at least $K-1$ sign changes. Since $e(D)=g(D)(1-D)$, it follows that $$e_n = g_n - g_{n-1},$$

for all n, with coefficients not explicitly defined by the polynomials taken to be zero. Consider the following subsequence of the nonzero coefficients of $g(D)$, $$g_{n_0}, g_{n_1}, \ldots, g_{n_L}$$

where $g_{n_0}$ is the first nonzero coefficient, and the remainder are the nonzero coefficients in $g(D)$ at which sign changes occur. Then the corresponding coefficients $$e_{n_0}, e_{n_1}, \ldots, e_{n_L}$$

satisfy $$\text{sign}[e_{n_i}] = \text{sign}[g_{n_i}].$$

This implies that the coefficients of $e(D)$ have at least $K-1$ sign changes. In addition, however, note that if $g_M$ is the last nonzero coefficient of $g(D)$, then $$\text{sign}[e_{M+1}] = -\text{sign}[g_M]$$
$$= -\text{sign}[g_{nL}].$$

This implies an additional sign change, yielding a total of at least K, which proves the lemma.

The following lemma, Lemma 2, shows how sign changes in the channel input contribute to the Euclidean weight in the channel output:

Let $$g(D) = \sum_{n=0}^{N} g_n D^n$$

be an integer polynomial input to the 1−D channel, with $g_0$ assumed to be nonzero. Assume that the coefficients of g(D) have L sign changes. Let $e(D)=g(D)(1-D)$ be the corresponding channel output. Then, the Euclidean weight of the output sequence satisfies:

$$|e|^2 \geq 2(L+1) \quad \text{(A2)}$$

As proof, the Euclidean weight of the output sequence can be written as $$|e|^2 = \sum_{n=0}^{N+1} \left( g_n - g_{n-1} \right)^2. \quad \text{(A3)}$$

It will be seen that if g(D) has no changes of sign in the sequence of coefficients, then $$|e|^2 \geq 2,$$

since the contribution to Equation (A3) of the term corresponding to the first nonzero coefficient to Equation (A3) is at least 1, as is the contribution corresponding to the zero coefficient following the last nonzero coefficient.

Suppose now that g(D) has L changes in sign, $L \geq 1$, which occur at coefficients $$g_{n_1}, g_{n_2}, \ldots, g_{n_L}.$$

And let E(j) equal the partial sum in Equation (A3) in which the index of summation runs from n=0 to n=j, then $$E(j) = \sum_{n=0}^{j} (g_n - g_{n-1})^2. \quad \text{(A4)}$$

Now, if it is assumed that E(N+1) denotes the complete sum $|e|^2$, then it follows that:

$$E(0) \geq 1 \quad \text{(A5)}$$

$$E(n_i) - E(n_{i-1}) \geq 2, i = 1, \ldots, L \quad \text{(A6)}$$

$$E(N+1) - E(n_L) \geq 1 \quad \text{(A7)}$$

The inequalities of Equations (A5) and (A7) arise from the contributions corresponding to the first nonzero coefficient and the first zero coefficient after the last nonzero coefficient. To prove inequality of Equation (A6), two cases must be considered:

First, assume that $g_{n_i-1}$, the coefficient preceding $g_{n_i}$ is nonzero. Then, the sign of $g_{n_i-1}$ must be the same as the sign of $g_{n_{i-1}}$, and opposite to the sign of $g_{n_i}$, since $n_i$ is the first position after $n_{i-1}$ at which there is a change. Therefore, in this case, $$(g_{n_i} - g_{n_i-1})^2 \geq 4.$$

In the other case, assume $g_{n_i-1}=0$ and let $g_j$ be the last nonzero coefficient before $g_{n_i}$, with $n_{i-1} \leq j < (n_i - 1)$. Then, it will be seen that $$E(n_i) - E(n_i - 1) \geq 1$$

and $$(E(n_i - 1) - E(j)) \geq 1.$$

Since $$E(j) \geq E(n_{i-1}),$$

it follows that inequality of Equation (A6) holds.

Combining Equations (A5), (A6) and (A7) yields $$|e|^2 = E(N+1) \geq 2(L+1)$$

This completes the proof of the second lemma.

To prove the Theorem, note that if one begins with a polynomial e(D) which is divisible by $(1-D)^K$, then the polynomial g(D) defined by $e(D)=g(D)(1-D)$ is divisible by $(1-D)^{K-1}$. From Lemma 1, it follows that g(D) has at least K−1 sign changes in its coefficient sequence. From Lemma 2, one concludes that e(D) must have Euclidean weight at least 2K, as stated by Equation (A1). This completes the proof of the Theorem.

The Theorem can now be applied to verify the bounds on coding gain of matched spectral null trellis codes.

For Bound 1, the case N=3 is verified by direct computation. The cases $N \geq 4$ follow directly from the Theorem.

For Bound 2, cases N=3,4,5 are verified by direct computation. The cases $N \geq 6$ follow from the Theorem and the fact that the minimum free distance of the uncoded binary $(1-D)^2$ channel is 4.

For Bound 3, cases N=3,4 are verified by direct computation. The cases $N \geq 5$ follow from the Theorem and the fact that the minimum free distance of the uncoded binary extended class 4 channel is 4.

Finally, Bound 4 follows directly from the Theorem.

We claim:

1. A method for coding an input string for a partial response channel having a transfer function to provide an output having a preselectable coding rate with an improved coding gain, said method comprising the steps of:

(a) determining each frequency at which there is a zero in the transfer function of the partial response channel; and (b) encoding an input string into a binary code string having a power spectrum value of zero for each such frequency.

2. The method of claim 1, including the further steps of:

(c) generating a channel output sequence responsively to transmission of the code string through the channel; and (d) calculating from the channel output sequence the most probable sequence among those having power spectrum values of zero for providing an output string substantially identical with the binary code string generated in step (b).

3. The method of claim 2, wherein the code sequence has a spectral content, and step (d) is executed by recursively updating the spectral content of the code sequence for reducing the complexity of calculation of the most probable channel output sequence having zero power at each such frequency.

4. The method of claim 2, wherein step (d) is executed by deriving a trellis diagram from a finite state diagram that depicts input sequences and corresponding channel output sequences having zero power at each such frequency.

5. The method of claim 2, including the additional step of:
decoding the calculated most probable code sequence to provide the output.

6. The method of claim 5, wherein the decoding step is performed by a sliding block decoder providing limited error propagation.

7. The method of claim 1, wherein the encoding step is performed by a finite state machine.

8. The method of claim 1, wherein during the encoding step the only binary code strings produced are those having a predetermined level of reliability.

9. The method of claim 1, wherein during the encoding step the only binary code strings produced are those having less than a predetermined number of consecutive zeroes in their channel output sequence, for thereby improving timing and gain control.

10. A method for coding an input string for a partial response channel having a transfer function to provide an output having a preselectable coding rate and a reliability determined by a preselectable coding gain, comprising the steps of:

(a) determining each frequency at which there is a zero in the transfer function of the partial response channel;

(b) concurrently determining how many consecutive derivatives of the transfer functions which zero at each of said frequencies; and (c) encoding an input string into a code string having a power spectrum value of zero for each such frequency and with a number of consecutive derivatives of the power spectrum which are zero, the last-mentioned number being determined by the coding gain preselected.

11. The method of claim 10, wherein during the encoding step the only binary code strings produced are those having a predetermined level of reliability.

12. The method of claim 10, wherein during the encoding step the only binary code strings produced are those having less than a predetermined number of consecutive zeroes in its channel output sequence, for thereby improving timing and gain control.

13. The method of claim 10, wherein coding gains of up to 7 dB are achieved.

* * * * *

UNITED STATES PATENT AND TRADEMARK OFFICE
CERTIFICATE OF CORRECTION

PATENT NO. : 4,888,779
DATED : December 19, 1989
INVENTOR(S) : Razmik Karabed and Paul Siegel It is certified that error appears in the above-indentified patent and that said Letters Patent is hereby corrected as shown below:

Column 7, Line 55, should read as follows:

$$L = \overline{c_7}(\overline{c_8} + \overline{c_9 c_{10}}) + \overline{c_{12}}(\overline{c_{11}} + \overline{c_9 c_{10}})$$

Column 11, Line 23, should read as follows:

$$X \cup X^c = [0,1]^8$$

Column 11, Line 24, should read as follows:

$$X \cap X^c = \emptyset$$

Column 11, Line 25, should read as follows:

$$Z \cup Z^c \cup Y = [0,1]^8$$

UNITED STATES PATENT AND TRADEMARK OFFICE
CERTIFICATE OF CORRECTION

PATENT NO. : 4,888,779
DATED : December 19, 1989
INVENTOR(S) : Razmik Karabed and Paul Siegel It is certified that error appears in the above-indentified patent and that said Letters Patent is hereby corrected as shown below:

Column 11, Line 50, should read as follows:

2) $w(y_{n-1}) = 4$ and $w(y_{n-1}|_1^8) = 4$ and $y_n \notin A$ $\rightarrow$ $y_{n-1} \in \overline{B}$
$4 \rightarrow 2$ Column 11, Line 58, should read as follows:

7) $w(y_{n-1}) = 6$ and $w(y_{n-1}|_1^8) = 4$ and $y_n \notin \overline{A}$ $\rightarrow$ $y_{n-1} \in B$
$2 \rightarrow 4$ Column 11, Line 64, should read as follows:

10) $w(y_{n-1}) = 6$ and $w(y_{n-1}|_1^8) \neq 4$ and $y_n \notin \overline{A}$ $\rightarrow$ $y_{n-1} \in A$
$1 \rightarrow 4$ Column 12, Line 40, should read as follows:

$$g(v_1, \ldots, v_4, v_1', \ldots, v_4') = ((\overline{v}_1 v_2 \overline{v}_3 v_4) + (\overline{v}_1 v_2 v_3 \overline{v}_4))(v_1' + \overline{v}_2' + v_3' + v_4') = u$$

Signed and Sealed this

Twenty-second Day of February, 1994

Attest:

BRUCE LEHMAN

*Attesting Officer*  *Commissioner of Patents and Trademarks*